United States Patent [19]

Gladstone et al.

[11] 4,093,825

[45] June 6, 1978

[54] DATA TRANSMISSION SYSTEM

[75] Inventors: David John Gladstone, Chigwell; Peter Andrew Moldram, Aylesbury, both of England

[73] Assignee: Post Office, London, England

[21] Appl. No.: 773,265

[22] Filed: Mar. 1, 1977

[30] Foreign Application Priority Data

Mar. 11, 1976 United Kingdom ............... 9870/76

[51] Int. Cl.$^2$ ............................................. H04J 3/06
[52] U.S. Cl. .......................... 179/15 BS; 179/27 FF; 340/146.1 BA
[58] Field of Search ............ 340/146.1 BA, 336, 337; 445/1; 179/15 AT, 27 FF, 15 BS, 15 AL; 178/69.1

[56] References Cited

U.S. PATENT DOCUMENTS

| | | | |
|---|---|---|---|
| 2,554,886 | 5/1951 | Stedman | 178/69.1 |
| 2,997,540 | 8/1961 | Ertman | 340/146.1 BA |
| 3,624,307 | 11/1971 | Sikorsky | 179/27 FF |
| 3,646,274 | 2/1972 | Nadil | 179/15 AL |
| 3,838,225 | 9/1974 | Limberg | 179/27 FF |
| 3,863,215 | 1/1975 | McGrogan | 340/146.1 BA |
| 3,937,892 | 2/1976 | Bloch | 179/15 AL |
| 3,978,457 | 8/1976 | Check | 445/1 |
| 4,009,566 | 3/1977 | Ho | 340/336 |

OTHER PUBLICATIONS

Transmission Systems for Communications; Staff, Bell Telephone Laboratories; copyright 1970; pp. 555-556.

Primary Examiner—David L. Stewart
Attorney, Agent, or Firm—Hall & Houghton

[57] ABSTRACT

A data communication system is described in which individual pulses or groups of pulses relating to specific items of information are multiplexed together to produce a pulse stream and this pulse stream is continually repeated so as to reduce the significance of errors in transmission which would be corrected automatically in the next transmission of the pulses relating to the incorrectly transmitted data. The system is described with reference to a data processing system for recording details and charges relating to manually connected telephone calls. Two-way communication between data entry and utilization means and a station control unit is provided in which the data rate for communication from the control unit to the data entry and utilization means is four times higher than that for communication from the data entry and utilization means to the control unit. The control unit includes for received data a persistence checking device in which a change in the incoming data is acted upon only if it is maintained for 16 consecutive frames.

17 Claims, 4 Drawing Figures

DATA TRANSMISSION SYSTEM

This invention relates to data transmission systems and has particular but not exclusive reference to systems for transmitting data between on-line entry and utilisation stations and a central processing system.

In co-pending British Patent Applications Nos. 8669/76, 8670/76, 8671/76 and 8672/76, there is described data processing equipment which is particularly suitable for the automatic recording of operator-handled telephone calls. In equipment of the kind described in the above-mentioned Applications it is necessary to provide a two-way data transmission system between operator position equipments and the call recording equipment. Among the problems associated with designing a data link of this kind is the need to protect the data against corruption in transmission and the need to avoid excessive expenditure of data processing effort in achieving error-free transmission of data.

It is accordingly an object of the present invention to provide a data transmission system which is particularly effective in overcoming these problems.

In accordance with a first aspect of the present invention a data transmission system for transmitting data from a first unit to a second unit comprises first digital multiplex means located at said first unit and coupled via first data highway means to first digital demultiplex means located at said second unit, the arrangement being such that data in a said first unit causes a signal to appear repeatedly in a time slot of the first multiplex means, said time slot being characteristic of the data.

In accordance with a second aspect of the present invention a data transmission system for transmitting data between at least one on-line station having data entry and utilisation means and a station control unit comprises first digital multiplex means located at said station control unit and coupled via first data highway means to first digital demultiplex means located at said data station and second digital multiplex means located at said data station and coupled via second data highway means to second digital demultiplex means located at said station control unit, the arrangement being such that entry of data at the station causes a signal to appear repeatedly in a time slot of the second multiplex means said time slot being characteristic of the data entered; and that data utilisation means at a said data station is responsive to repeated occurrences of a signal in a time slot of the first multiplex means said time slot being characteristic of how the data is to be utilised.

Preferably the station control unit includes persistence check means operable to suppress signals which do not maintain a predetermined threshold number of repetitions in their respective time slot.

A data station may be operated by an operator and may have display means for the operator.

A data station may be a telephone operator's position and data entry means may be keys for entering details of a telephone call to be set up; the data utilisation means may include a visual display unit for presenting to an operator information required for call routing and charging purposes, credit card verification details and the like. The visual display unit may be refreshed repeatedly by data transmitted via the second multiplex/-demultiplex means.

Preferably the station also includes rollover means operable to disregard predetermined second time slots on the occurrence of a new signal in one of predetermined first time slots.

In order that the invention may be fully understood and readily carried into effect it will now be described with reference to an embodiment in the form of a data link between an operator's position equipment (OPE) and an operator's position control unit (OCU) of an automatic call recording equipment of the kind described in British Patent Applications Nos. 8669/76, 8670/76, 8671/76 and 8672/76.

Figure 1A:
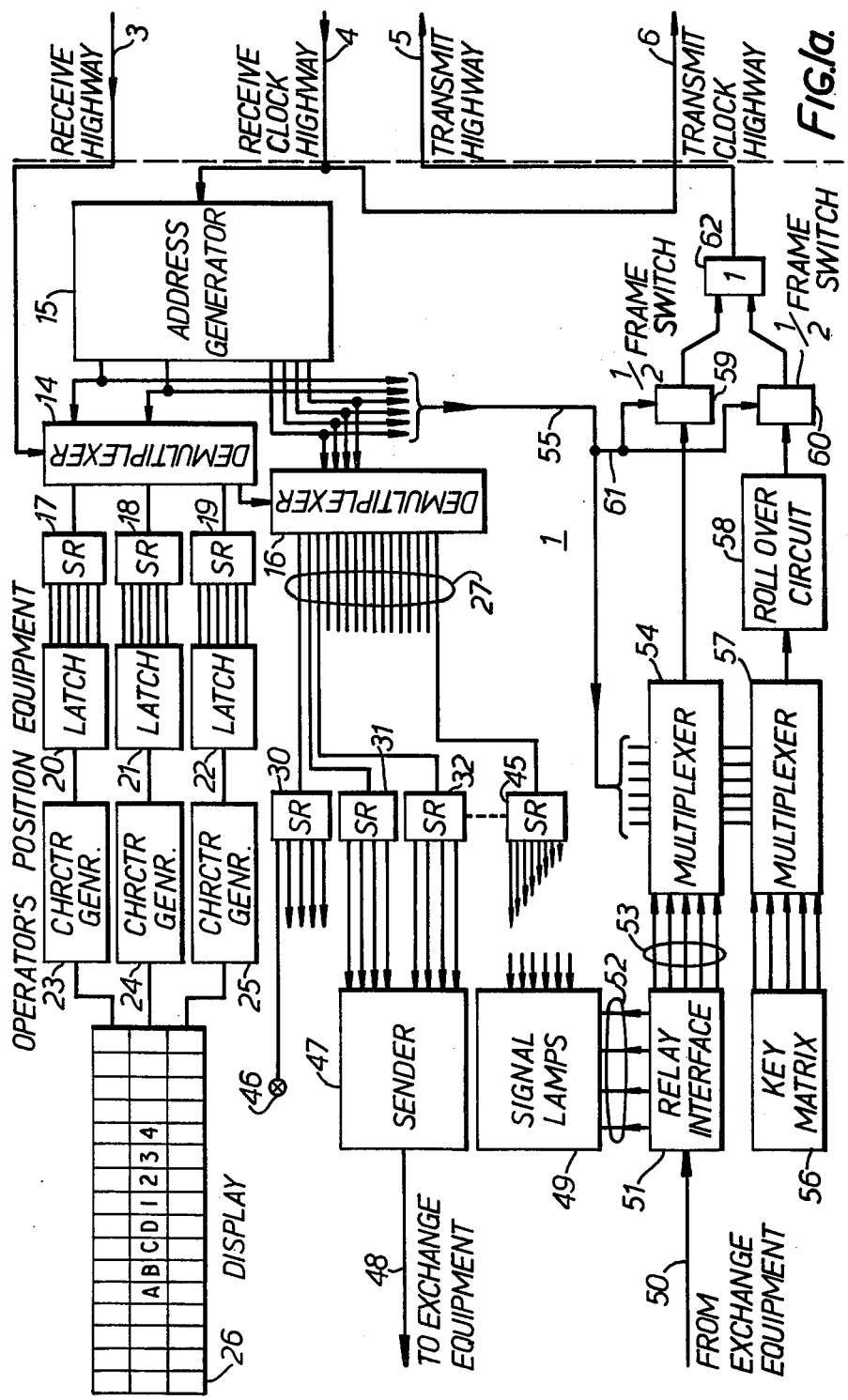
FIGS. 1a and 1b show in diagrammatic form one example of the present invention.
Figure 1B:
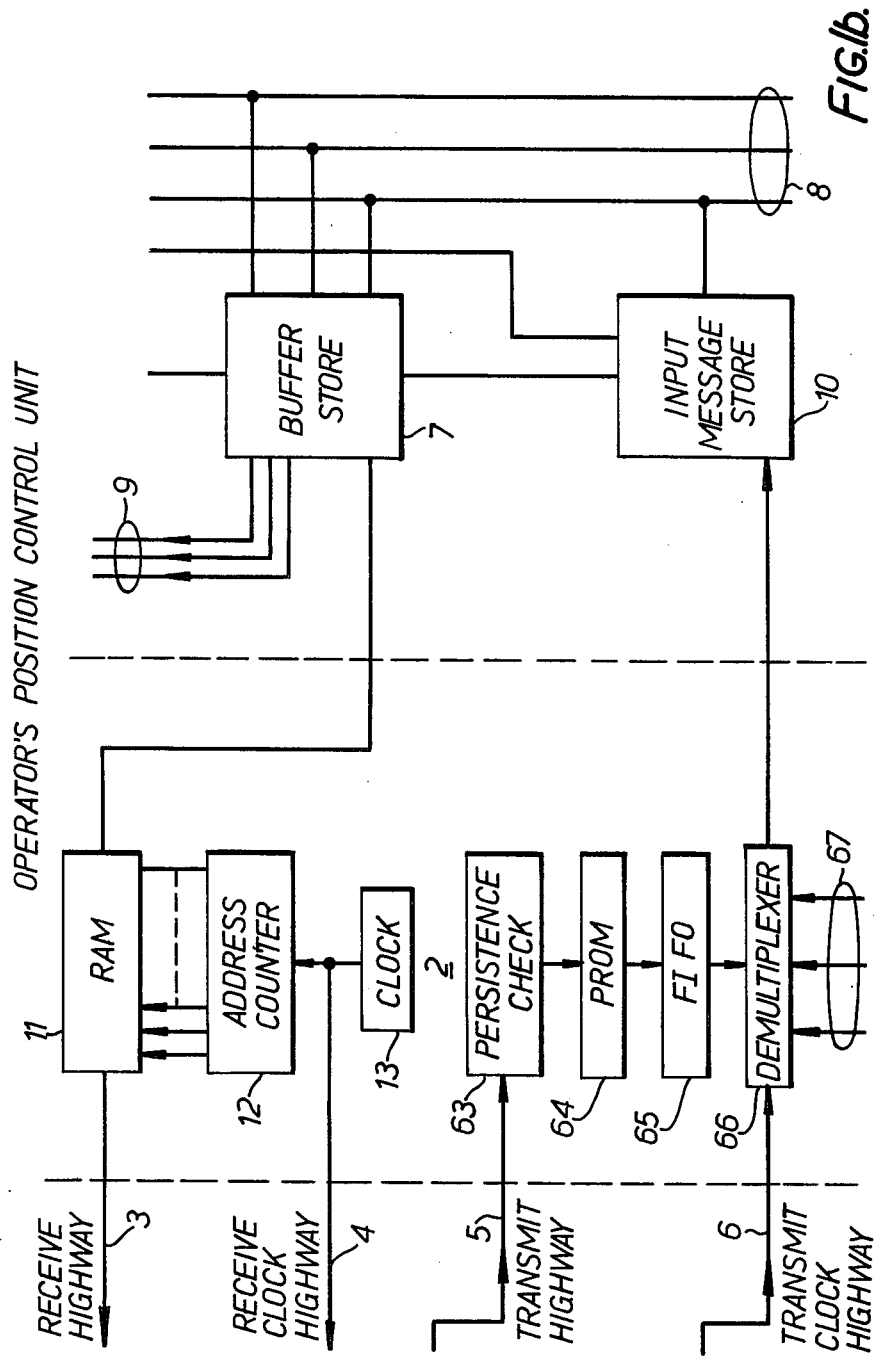

Referring now to FIG. 1, there is shown an operator's position equipment (OPE) 1 connected to an operator's position control unit (OCU) 2 by means of a receive highway 3, a receive clock highway 4, a transmit highway 5 and a transmit clock highway 6. The terms "receive" and "transmit" refer to the direction of communication relative to the OPE 1.

The OCU 2, most of which is not shown in FIG. 1 but may have the structure described in the above-mentioned British Patent Applications, includes a buffer store 7 for outgoing signals which is connected to a bus highway 8 by means of which it is connected to a central processing unit and other components of the OCU. The buffer store 7 is also provided with outgoing highways 9 which are connected to other OPE's in the manner to be described herein with reference to the OPE 1. Incoming signals to the OCU 2 are stored in an input message store 10 which is connected to the bus highway 8.

Outgoing signals from the OCU 2 appear at the output of the buffer store 7 and are stored in a random access memory 11, the addresses of which are addressed cyclically in sequence by means of an address counter 12 driven by clock pulses from a clock 13. The output signals of the RAM 11 are applied to the receive highway 3 and the clock pulses from the clock 13 are applied to the receive clock highway 4.

In the OPE 1, the receive highway 3 is connected to a demultiplexer 14 controlled by two outputs of an address generator 15 to which the clock pulses from the clock 13 are applied via the receive clock highway 4. Other outputs of the address generator 15 are applied to a second demultiplexer 16 which receives via the demultiplexer 14 certain of the data pulses applied to it from the receive highway 3. The demultiplexer 14 has three other outputs which are connected respectively to three shifting registers 17, 18 and 19, which serve to convert the data from serial to parallel form 8 bits at a time. The outputs of the registers 17, 18 and 19 are applied in parallel to latches 20, 21 and 22 respectively, and signals stored in these latches are connected to drive character generators 23, 24 and 25 respectively to produce characters in three rows each of 16 characters of an electroluminescent display panel 26.

The demultiplexer 16 has sixteen output connections 27, which are connected respectively to sixteen shifting registers 30, 31, 32 ... 45. The shifting registers 30 to 45 function in the same way as registers 17, 18 and 19, that is to say they convert the serial data into 8-bit parallel form. The outputs of the registers 30 to 45 are connected to signal lamps and switches at the operator's position. One such signal lamp is indicated at 46 for diagrammatic purposes only. The outputs of two of the shifting registers 31 and 32 are applied to a sender 47 which contains the switches operable by the operator and enables signals to be sent via lines 48 to the exchange equipment such as, for example, relays or semiconductor switches used to provide the required controllable connections between telephone subscribers. Other signal lamps are included within the rectangle 49 and are connected selectively to outputs of various stages of the shifting registers 30 to 45. These signal lamps can alternatively be energized from the exchange equipment in response to signal received via a line 50 applied to a relay interface unit 51 which has connections 52 to the lamps 49. The signals from the exchange equipment which may represent, for example, the completion of a telephone connection or the termination of the connection, are also transmitted via the connections 53 to a multiplexer 54 controlled by the outputs of the address generator 15 which are transmitted to it via the lines 55.

The operator is also provided with a plurality of keys for entering various details of a telephone connection to be made or for making enquiries of the equipment, for example, as to the validity of a credit card number; such details are not required by the exchange equipment for effecting the connection and consequently are not entered by means of the sender 47. These additional keys are included within a key matrix 46 which is connected to a multiplexer 57, also driven by the outputs of the address generator 15. The output of the multiplexer 57 is applied to a rollover circuit 58, the function of which is to disable the outputs of other keys of the matrix 56 when one key is pressed so as to avoid the garbling of data due to the almost simultaneous depression of two keys. The multiplexed outputs of the multiplexer 54 and the circuit 58 are applied via respective half frame switches 59 and 60, controlled by a signal on a conductor 61 picked off from the lines 55, to an OR-gate 62. The combined multiplexed signals from the gate 62 are transmitted over the transmit highway 5 to a presistence checking circuit 63 included in the operator's position control unit 2. The outputs of the persistence checking circuit 63 are applied to a PROM 64, the function of which is to enable the positions of pulses or groups of pulses in the stream to be changed if required due to, for example, some reorganisation of the system. From the PROM 64 the signals are applied to a FIFO buffer 65 from which the signals are transferred to a demultiplexer 66 controlled by the clock signals from the clock 13 after transmission to the OPE 1 over the receive clock highway 4 and returned via the transmit clock highway 6. Signals from other OPE's are applied to the demultiplexer 66 via conductors 67. The demultiplexed signals from the demultiplexer 66 are applied to the input message store 10 for use by the OCU.

Figure 2:
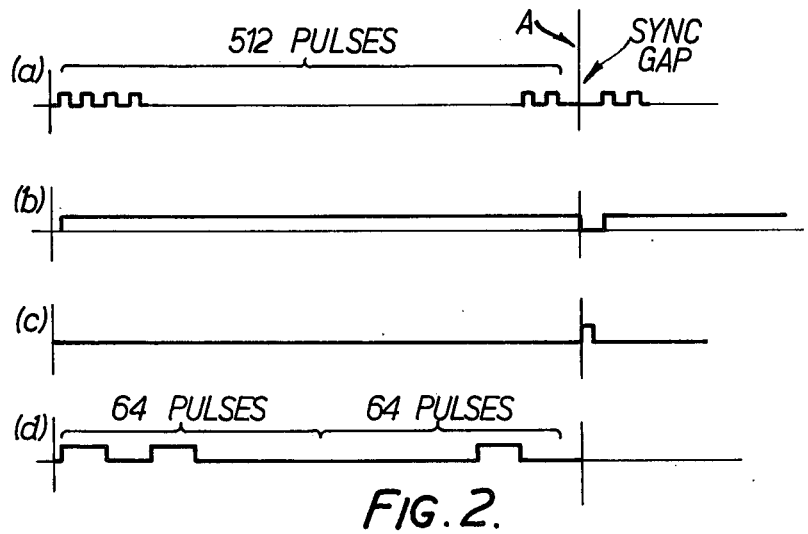
FIG. 2 shows clock pulse wave forms employed in the circuit of FIG. 1.

In one example of the invention the pulse repetition frequency of the clock 13 is 500 kHz, and the clock pulses are formed into frames occupying the space of 513 clock pulses but having only 512 pulses within that space, the 513th pulse being missing for the purpose of synchronisation. FIG. 2 shows at A the waveform of the clock pulses with the synchronisation gap indicated at A. In order to derive a synchronisation signal from this waveform a monostable circuit having a time constant slightly longer than the duration of a clock pulse and its succeeding space is connected to receive the clock pulses. During the 512 consecutive clock pulses the monostable is held in the one state but when the synchronisation gap occurs the monostable reverts to the 0 state as indicated by the waveform B of FIG. 2 and can be used to produce a synchronisation pulse indicated by waveform C of FIG. 2. Because the operator's position equipment 1 may be some distance, for example, several hundred meters from the operator's position control unit 2, significant delays could be incurred by the data signals transmitted over the receive highway 3 and the transmit highway 5. In order to maintain synchronism the clock pulses are therefore also transmitted over the receive clock highway 4 and the transmit clock highway 5 following substantially the same route as the data highways 3 and 5. The clock signal returned over the transmit clock highway 6 to the OCU 2 may have the same form as that transmitted over the receive clock highway 4 to the OPE 1, or it may be divided in frequency by four and have the waveform shown in FIG. 2D consisting of 128 pulses within the space provided for 512 pulses in the waveform A in FIG. 2.

The data transmitted over the receive highway 3 to the OPE 1 from the RAM 11 consists of selected pulses synchronised with the clock pulses transmitted over the receive clock highway 4, which pulses either alone or in combination correspond to data to be displayed on the display panel 26, signal lamps to be illuminated or keys of the sender 47 to be energized. The digits of a frame of data are divided into 8-bit bytes, which are themselves divided into groups of four, of which the first three are used to control the display panel 26 and the fourth is used to energize signal lamps or keys of the sender 47. The demultiplexer 14 divides the data into the 8-bit bytes and distributes three of each four to the shifting registers 17, 18, 19 and the fourth to the multiplexer 16. The multiplexer 16 is controlled by the outputs of the address generator 15 to direct every fourth byte, that is to say the bytes which are transmitted to it by the multiplexer 14, to the shifting registers 30 to 45. The latches 20, 21 and 22 store the bytes defining the characters to be displayed in the upper middle and lower rows of the display panel 26, the character generators 23, 24 and 25 converting the data into a form suitable for energizing the electro-luminescence elements forming the panel 26.

Since the address counter 12 is driven by the clock signals from the clock 13, it will be apparent that the addresses of the RAM 11 are addressed cyclically in sequence so that if the data in the RAM 11 is unchanged the frames of data transmitted over the receive highway 3 are all identical so that the data stored in the shifting registers 17, 18, 19 and 30 to 45 are continuously refreshed once in each frame. This continuous refreshment of the data has the advantage that any corruption of a single frame will have only a transient effect on the display presented to the operator.

The data transmitted from the OPE 1 to the OCU 2 is of the same form as the data transmitted from the OCU 2 to the OPE 1 as described above, but it has a pulse repetition frequency one-quarter that of the latter data. The multiplexers 54 and 57 are arranged to operate in the same way as the RAM 11 and produce repeatedly frames having pulses in the same positions when the data is unchanged. The multiplexer 54 sends pulses for one half frame and the multiplexer 57 sends pulses for the other half frame. The demultiplexer 66 is arranged to respond to the clock signal transmitted to it via the transmit clock highway 6 at a rate one-quarter that of the pulse repetition rate of the clock pulses from the clock 13. This may be achieved in a variety of ways, for example the demultiplexer 66 may include a divide-by-four circuit to which the clock signal is applied.

Figure 3:
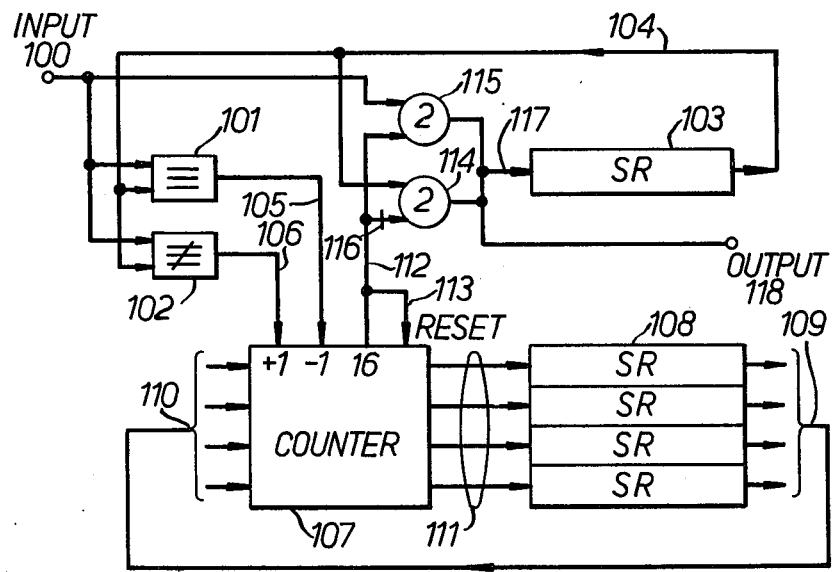
FIG. 3 shows in greater detail an example of a persistence checking circuit suitable for use in the circuit of FIG. 1.

The data received by the OCU 2 over the transmit highway 5 is subjected to a persistence check to avoid any spurious response of the OCU 2 to momentarily corrupted data applied to it over the transmit highway 5. One suitable form of persistence checking circuit is shown in FIG. 3 and has an input terminal 100 to which the data carried by highway 5 is applied. The terminal 100 is connected to an input of an equivalence gate 101 and a non-equivalence gate 102. The incoming data is compared with the preceding frame of data stored in a shifting register 103 from which it is stepped out in serial manner in synchronism with the incoming data on to a conductor 104 by which it is applied to second inputs of the gates 101 and 102. The outputs of the gates 101 and 102 are applied via conductors 105 and 106 to inputs of a counter 107 to decrement by one and increment by one respectively the value stored in the counter at the time. A four-bit number corresponding to each of the bits stored in the shifting register 103 is stored in four parallel shifting registers 108 and is stepped along in synchronism with the data in the shifting register 103. The four-bit number appearing at the right-hand end of the shifting register 108 is applied via the channel 109 to inputs 101 of the counter 107. The result of the counting operation of the counter 107 appears on conductors 111 which are connected to the inputs at the left-hand side of the shifting registers 108. The counter 107 has an output produced on a conductor 112 when the total in the counter reaches 16, that is to say when the binary number 1111 has 1 added to it to produce a carry. The conductor 112 is connected to an input 113 of the counter 107 to reset the counter to zero if the counter does not automatically step from 1111 to 0000. The conductor 112 is also connected via an inverting element 116 to an input of a two-gate 114 and directly to an input of a second two-gate 115. The second input of the gate 114 is connected to the conductor 104 and the second input of the gate 115 is connected to the input terminal 100. The outputs of the gates 114 and 115 are connected together and via a conductor 117 to the input at the left-hand end of the shifting register 103. An output terminal 118 is also connected to the conductor 117.

The function of the checking circuit shown in FIG. 3 is to assume that the incoming frame of data is unchanged from the previous frame of data; only when a change in any particular bit has occurred 16 times consecutively is that bit changed. The shifting registers 103 and 108 each has 128 stages because a frame of data would contain 128 pulse positions. If the incoming data is unchanged for a large number of frames the numbers stored in the shifting registers 108 corresponding to each bit stored in the register 103 will all be zero. If now one bit of the incoming data is altered this difference from the data stored in the register 103, and recirculated via the gate 114, will be detected by the gate 102 and a pulse will be applied via the conductor 106 to the counter 107 to increment the number corresponding to that bit in the registers 108. After 16 such frames the counter 107 will produce an output on the conductor 112 thereby opening the gate 115 and closing the gate 114 which is normally open to permit the recirculation of the data in the shifting register 103. The opening of the gate 115 permits the digit of the incoming data to be substituted for that previously stored in the register 103 at that position and also causes the data appearing at the output to the terminal 118 to be similarly updated.

If, however, a spurious pulse appears in the incoming data or a pulse which should be present is for some reason inhibited temporarily, the difference between the data stored in the register 103 and the incoming data will still be detected by the gate 102 and cause the total in the counter to be incremented by 1 at each occurrecne. However, later occurrences of the same bit in the incoming data and from the register 103 will cause the gate 101 to produce output signals which will decrement the total stored by the counter 107, so that the data appearing at the output of terminal 108 will be derived from the register 103 and will not follow the spurious variations of the incoming data. The counter 107 is arranged so that it counts positive numbers only, and on counting downwards 26 the value 0000 in response to signals applied via the conductor 105 it does not thereafter change its value with further decrements of 1 but remains at 0000.

Although the invention has been described with reference to automatic telephone call recording equipment, it will be appreciated that it could equally well be applied to, for example, airline seat reservation systems or banking, where many terminals would be connected to a central computing arrangement. The present invention may be used in conjunction with any or all of the inventions described in the above-mentioned co-pending British Patent Applications.

We claim:

1. A data transmission system for transmitting data between a first unit and a second unit comprising first digital multiplex means located at said first unit and coupled via first data highway means to first digital demultiplex means located at said second unit, clock pulse generating means in the first unit connected to the first digital multiplex means to apply clock pulses thereto to effect the multiplexing of data on the first data highway means, first clock highway means connected from the clock pulse generating means to the second unit to enable clock pulses from the clock pulse generating means to be applied to the first digital demultiplex means to effect the demultiplexing of data received via the first data highway means, second digital multiplex means located in the second unit coupled by second data highway means to second digital demultiplex means located in the first unit, the second multiplex means being coupled to the first clock highway means to effect multiplexing of data on to the second data highway means in response to clock signals from the first clock highway means, and second clock highway means connected from the first clock highway means at the second unit to the first unit, the second digital demultiplex means being connected to the end of the second clock highway means at the first unit to effect demultiplexing of data received via the second data highway means in response to the clock signal received via the second clock highway means, the first unit including a first source of data which causes a signal to appear repeatedly in a particular time slot of each multiplex frame of the first multiplex means, and said second unit including a second source of data which causes a signal to appear repeatedly in a particular time slot of each multiplex frame of the second digital multiplex means, said particular time slots being characteristic of the data.

2. A system according to claim 1 wherein the first digital demultiplex means includes a first demultiplexer to which the first data highway means is connected and having a plurality of outputs, and a second demultiplexer having its input connected to an output of the first demultiplexer, address generating means being provided connected to both first and second demultiplexers and connected to the first clock highway means.

3. A system according to claim 1 wherein the second digital multiplex means and the second digital demultiplex means have a lower demultiplexing frequency than the first digital multiplex means and the first digital demultiplex means, and there is provided persistence checking means in the input of the second digital demultiplex means.

4. A system according to claim 3 wherein the persistence checking means is arranged to transmit to the second digital demultiplex means a change to a new digit in any particular time slot only after the new digit has been maintained for a predetermined number of consecutive multiplex frames.

5. A data transmission system for transmitting data between at least one on-line station having data entry and utilisation means and a station control unit comprising first digital multiplex means located at said station control unit and coupled via first data highway means to first digital demultiplex means located at said data station, and second digital multiplex means located at said data station and coupled via second data highway means to second digital demultiplex means located at said station control unit, there being provided clock pulse generating means in the station control unit and connected to drive the first digital multiplex means, first clock highway means connected to convey the clock from the station control unit to the station, the first digital demultiplex means and the second digital multiplex means being connected to respond to the clock from the first clock highway means, and second clock highway means connected from the first clock highway means at the station to the second digital demodulating means at the station control unit, the said station including means responsive to the entry of data to cause a signal to appear repeatedly in a particular time slot in each succeeding multiplex frame of the second multiplex means, said particular time slot being characteristic of the data entered; and the station control unit including means for repeatedly generating a data signal in a specific time slot in each multiplex frame of the first multiplex means and the data utilisation means at said station is responsive to repeated occurrences of the data signal in the specific time slot of the first multiplex means, said specific time slot being characteristic of how the data is to be utilised.

6. A system according to claim 5 wherein the first digital demultiplex means includes a first demultiplexer to which the first data highway means is connected and having a plurality of outputs, and a second demultiplexer having its input connected to a first output of the first demultiplexer, address generating means being provided connected to both first and second demultiplexers and connected to respond to clock pulses from the first clock highway means.

7. A system according to claim 6 wherein the outputs of the first demultiplexer except its first output and the outputs of the second demultiplexer are connected to respective shifting registers which are arranged to effect serial to parallel conversion of the data applied to them.

8. A system according to claim 7 wherein the data utilisation means includes a visual display unit and the outputs of certain of the shifting registers are used to control the display produced by the visual display unit.

9. A system according to claim 8 in which the certain shifting registers are connected to outputs of the first demultiplexer other than the first output.

10. A system according to claim 7 wherein the outputs of selected stages of the shifting registers are connected to energize key switches or signal lamps.

11. A system according to claim 5 wherein the data entry means includes a key matrix.

12. A system according to claim 11 including a roll-over circuit connected to the key matrix to inhibit for an interval of time the generation of signals in response to the depression of other keys after one key has been depressed.

13. A system according to claim 5 wherein persistence checking means is provided in the input to the second digital demultiplex means, the persistence checking means being arranged to transmit to the second digital demultiplex means a change to a new digit in any particular time slot only after the new digit has been maintained for a predetermined number of multiplex frames.

14. A system according to claim 5 wherein the time slots of the first multiplex means are of shorter duration than the time slots of the second multiplex means.

15. A system according to claim 14 wherein the time slots of the first multiplex means have a duration which is a sub-multiple of the duration of the time slots of the second multiplex means.

16. A system according to claim 15 wherein the sub-multiple is a quarter.

17. A system according to claim 5 wherein each data station is a telephone operator's position, the data entry means include keys for entering details of a telephone call and the data utilisation means is a visual display unit for displaying to the operator information required for call routing and charging purposes.

* * * * *